US012675457B1

(12) United States Patent
Bermanis et al.

(10) Patent No.: US 12,675,457 B1
(45) Date of Patent: Jul. 7, 2026

(54) DERIVATION OF A SCORING FUNCTION FOR ANOMALY DETECTION USING EIGEN-DECOMPOSITION

(71) Applicant: ThetaRay Ltd., Hod HaSharon (IL)

(72) Inventors: Amit Bermanis, Hod HaSharon (IL);
Amir Averbuch, Hod HaSharon (IL);
David Segev, Hod HaSharon (IL)

(73) Assignee: ThetaRay Ltd., Hod HaSharon (IL)

( * ) Notice: Subject to any disclaimer, the term of this patent is extended or adjusted under 35 U.S.C. 154(b) by 1 day.

(21) Appl. No.: 18/638,926

(22) Filed: Apr. 18, 2024

Related U.S. Application Data

(60) Provisional application No. 63/461,301, filed on Apr. 23, 2023.

(51) Int. Cl.
G06F 16/00 (2019.01)
G06F 16/22 (2019.01)
G06F 16/28 (2019.01)

(52) U.S. Cl.
CPC ........ G06F 16/2264 (2019.01); G06F 16/285 (2019.01)

(58) Field of Classification Search
CPC ........ G06Q 50/01; G06Q 30/02; G06Q 40/00; G06Q 30/018; G06Q 10/063; G06Q 10/20; G06N 3/088; G06N 20/10; G06N 3/084; G06N 3/08; G06N 3/044; G06N 3/045; G06N 3/047; G06F 11/0721; G06F 11/0751; G06F 16/2264; G06F 16/285; G06F 16/22; H04L 63/1425; H04L 63/145
See application file for complete search history.

(56) References Cited

U.S. PATENT DOCUMENTS

| | | | | |
|---|---|---|---|---|
| 10,148,680 B1 * | 12/2018 | Segev | | H04L 63/1425 |
| 10,692,004 B1 * | 6/2020 | Segev | | G06Q 50/01 |
| 10,996,664 B2 * | 5/2021 | Jha | | G05B 23/0283 |
| 11,544,634 B2 * | 1/2023 | Kamulete | | G06N 20/20 |
| 11,715,151 B2 * | 8/2023 | Yang | | G06N 20/00 |
| | | | | 705/27.1 |
| 11,886,994 B1 * | 1/2024 | Segev | | G06N 3/0455 |
| 11,935,385 B1 * | 3/2024 | Averbuch | | G06F 21/55 |
| 11,995,068 B1 * | 5/2024 | Allouche | | G06F 16/2365 |

* cited by examiner

*Primary Examiner* — Yicun Wu
(74) *Attorney, Agent, or Firm* — Nathan & Associates Patent Agents Ltd.; Menachem Nathan

(57) ABSTRACT

A computer program product and computer system configured to perform a method including: receiving input data including a multidimensional data point (MDDP), deriving a scoring function via data whitening by eigen-decomposition, and using the scoring function to provide a probability of whether the MDDP is normal or is an anomaly.

24 Claims, 3 Drawing Sheets

DERIVATION OF A SCORING FUNCTION FOR ANOMALY DETECTION USING EIGEN-DECOMPOSITION

CROSS REFERENCE TO RELATED APPLICATIONS

This application claims priority from U.S. provisional patent application No. 63/461,301 filed Apr. 23, 2023, which is incorporated herein by reference in its entirety.

FIELD

Embodiments disclosed herein relate in general to methods and systems for derivation of a scoring function via data whitening by eigen-decomposition, and in particular to detection of anomalies, which are indicative of an undesirable event among multidimensional data points (MDDPs) of tabular data by an unsupervised method.

BACKGROUND

Huge amounts of data are generated by many sources. "Data", which also includes tabular data, refers to a collection of information, the result of experience, observation, measurement, streaming, computing, sensing or experiment, other information within a computer system, or a set of premises that may consist of numbers, characters, images, or as measurements of observations.

Static and dynamic "high dimensional big data" (HDBD) are common in a variety of fields. Exemplarily, such fields include finance, energy, medical, transportation, communication networking (i.e., protocols such as TCP/IP, UDP, HTTP, HTTPS, ICMP, SMTP, DNS, FTPS, SCADA, wireless and Wi-Fi) and streaming, process control and predictive analytics, social networking, imaging, e-mails, governmental databases, industrial data, healthcare and aviation. HDBD is a collection of multi-dimensional data points (MDDPs). A MDDP, also referred to as "data sample", "sampled data", "data point", "vector of observations", "vector of transactions" or "vector of measurements", is one unit of data from the original (source, raw) HDBD. An MDDP may be expressed as a combination of numeric, Boolean, integer, floating, binary or real characters. HDBD datasets (or databases) include MDDPs that may be either static or may accumulate constantly (dynamic). MDDPs may include (or may be described by) hundreds or thousands of parameters (or "features").

The terms "parameter" or "feature" refer to an individual measurable property of phenomena being observed. A feature may also be "computed", i.e., be an aggregation of different features to derive an average, a median, a standard deviation, etc. "Feature" is also normally used to denote a piece of information relevant for solving a computational task related to a certain application. More specifically, "features" may refer to specific structures ranging from simple structures to more complex structures such as objects. The feature concept is very general and the choice of features in a particular application may be highly dependent on the specific problem at hand. Features can be described in numerical (3.14), Boolean (yes, no), ordinal (never, sometimes, always), or categorical (A, B, O) manner.

There are various methods for detection of anomalies among multidimensional data points (MDDPs) in an unsupervised way, which means that normal and anomalous data points are unknown but their performances related to detection rate and false alarms are unsatisfactory. However, the demand for such methods remains high, and new, improved methods are constantly sought. In particular, it would be desirable to have automatic and unsupervised anomaly detection methods and associated systems characterized by not having or using domain expertise, signatures, rules, patterns or semantics understanding of all the available features.

SUMMARY

Embodiments disclosed herein relate to the derivation of score function that assigns a score to each MDDP that indicates whether this MDDP is normal or anomalous (abnormal). A detected anomaly may be indicative of an undesirable event that deviates from normality.

In this description, an "undesirable event" indicated by an anomaly or by an "abnormal MDDP" may for example be any of (but not limited to): a cyber-threat, a cyber-attack, malware presence, an operational malfunction, an operational breakdown, a process malfunction, a process breakdown, a medical event, a financial risk event, a financial threat event, financial crimes such as financial fraud event, money laundering, a financial network intrusion event, human trafficking and/or terrorist activities.

Consistent with disclosed embodiments, a computer program product includes: a non-transitory tangible storage medium readable by a processing circuit and storing instructions for execution by the processing circuit for performing a method including: receiving input data including a multidimensional data point (MDDP), deriving a scoring function via data whitening by eigen-decomposition, and using the scoring function to classify the MDDP as normal or as an anomaly. In some embodiments, the classification of the MDDP as an anomaly is indicative of detection of an unknown undesirable event, and, when the MDDP is classified as an anomaly, the method further includes performing one or more of triggering an alarm, and/or sending a notification to a user or a data client system.

In some embodiments, the deriving includes, training in a training phase that includes, for a training dataset T, forming an RBF kernel matrix $G_{n \times n}$ for T with $\sigma=J$, forming a random matrix $K_{(p+10) \times n}$ whose entries are Independent and Identically Distributed (i.i.d.) as a real Gaussian random variable of zero mean and unit variance, applying Rank Revealing QR (RRQR) to a matrix KG to get a set of p reference points R, and applying eigen decomposition to a reference submatrix $\tilde{G}_{p \times p}$ to get $\tilde{U}_{p \times p}$ and $\tilde{S}_{p \times p}$, where $\tilde{G}_{p \times p}$ is a submatrix of $G_{n \times n}$ which is restricted only for the p reference points and where $\tilde{U}_{p \times p}$ and $\tilde{S}_{p \times p}$ are orthogonal and diagonal matrices, respectively. $\mathbb{R}^p$ In some embodiments, the training in the training phase further includes embedding T in $\mathbb{R}^p$: $T_{n \times p} = \bar{h}(T) = g_\sigma(T, R)\tilde{U}\tilde{S}^{-1/2}$, post-embedding scaling by computing the columns means of T for embedding centralization and centralize it, applying SVD to T, to get $$T = X_{n \times p} \Lambda_{p \times p} Y_{p \times p}^T,$$

setting $$k = \min\left\{ j \,\middle|\, \sum_{i=1}^{j} \lambda_i > \rho \sum_{i=1}^{p} \lambda_i \right\}$$

to form $\Lambda_k$ and $Y_k$ where $\Lambda_k$ is the upper left k×k submatrix of $\Lambda$ and $Y_k$ is the k×p submatrix of Y which contains its k leftmost columns, and projecting centered embedded training data using a transformation $$\psi(x) = \tilde{h}(x) Y_k \Lambda_k^{-\frac{1}{2}}, x \in T$$

such that outputs of the training phase include reference set R, a pre-embedding scaler, a post-embedding scaler, $\tilde{U}$, S, $\Lambda_k$, $Y_k$, and $\Psi(T)=\{\psi(x)\}_{x \in T}$.

In some embodiments, inputs to the deriving and using the scoring function include an MDDP $x \in \mathbb{R}^J$, outputs of the training phase, and 1—number of nearest neighbors for scoring.

In some embodiments, the deriving and using the scoring function includes applying a pre-embedding scaler to x, embedding x in $\mathbb{R}^p$: $\tilde{h}(x)=g_\sigma(x, R)\tilde{U}\tilde{S}^{-1/2}$, applying the post-embedding scaler to $\tilde{h}(x)$, projecting centered embedded data using a transformation $$\psi(x) = \tilde{h}(x) Y_k \Lambda_k^{-\frac{1}{2}},$$

computing the $\ell$ nearest neighbors of $\psi(x)$, $\{y1, \ldots, y\ell\} \subset \Psi(T)$, and returning $$s(x) = \sum_{i=1}^{l} \|\psi(x) - y^i\|.$$

In some embodiments, the returned score s(x) is used to determine whether an MDDP $x \in \mathbb{R}^J$ is normal or is an anomaly. In some embodiments, the method performed by the computer program product further includes: when the MDDP is classified as an anomaly, performing one or more of triggering an alarm, and sending a notification to a user or a data client system, wherein classification of the MDDP as an anomaly is indicative of detection of an unknown undesirable event.

In some embodiments, the deriving includes a training phase using a training dataset, and the computer program product is configured to reduce a computational cost by embedding the training dataset such that a number of principal component analysis computations is reduced from O(n^3) computations to O(n^2p) computations, where n is a number of training datapoints and p is an embedding dimension, and wherein p<n.

In some embodiments, the computer program product is configured to reduce a computational cost of using the scoring function by embedding datapoints to be scored such that a number of scoring computations is reduced from O(n^2) computations to O(p^2) computations for a single datapoint, where n is a number of datapoints and p is an embedding dimension, and wherein p<n.

Consistent with disclosed embodiments, a computer system, includes: a hardware processor configurable to perform a method includes: receiving input data including a multi-dimensional data point (MDDP), deriving a scoring function via data whitening by eigen-decomposition, and using the scoring function to classify the MDDP as normal or as an anomaly. In some embodiments, the classification of the MDDP as an anomaly is indicative of detection of an unknown undesirable event, and, when the MDDP is classified as an anomaly, the hardware processor is further configurable to perform one or more of triggering an alarm, and/or sending a notification to a user or a data client system.

In some embodiments, the deriving includes, training in a training phase that includes, for a training dataset T, forming an RBF kernel matrix $G_{n \times n}$, for T with $\sigma$=J, forming a random matrix $K_{(p+10) \times n}$ whose entries are i.i.d. as a real Gaussian random variable of zero mean and unit variance, applying Rank Revealing QR (RRQR) to a matrix KG to get a set of p reference points R, and applying eigen decomposition to the reference submatrix $\tilde{G}_{p \times p}$ to get $\tilde{U}_{p \times p}$ and $\tilde{S}_{p \times p}$, where $\tilde{G}_{p \times p}$ is a submatrix of $G_{n \times n}$ which is restricted only for the p reference points and where $\tilde{U}_{p \times p}$ and $\tilde{S}_{p \times p}$ are orthogonal and diagonal matrices, respectively.

In some embodiments, the training in the training phase further includes embedding T in $\mathbb{R}^p$: $T_{n \times P}=\tilde{h}(T)=g_\sigma(T, R)\tilde{U}\tilde{S}^{-1/2}$, post-embedding scaling by computing the columns means of T for embedding centralization and centralize it, applying SVD to T, to get $$T = X_{n \times p} \Lambda_{p \times p} Y_{p \times p}^T, \text{ setting } k = \min\left\{ j \,\Big|\, \sum_{i=1}^{j} \lambda_i > \rho \sum_{i=1}^{p} \lambda_i \right\}$$

to form $\Lambda_k$ and $Y_k$ where $\Lambda_k$ is the upper left k×k submatrix of $\Lambda$ and $Y_k$ is the k×p submatrix of Y which contains its k leftmost columns, and projecting centered embedded training data using a transformation $$\psi(x) = \tilde{h}(x) Y_k \Lambda^{-\frac{1}{2}}, x \in T$$

such that outputs of the training phase include: reference set R, a pre-embedding scaler, a post-embedding scaler, $\tilde{U}$, S, $\Lambda_k$, $Y_k$ and $\Psi(T)=\{\psi(x)\}_{x \in T}$.

In some embodiments, inputs to the deriving and using the scoring function include an MDDP $x \in \mathbb{R}^J$, outputs of the training phase, and 1—number of nearest neighbors for scoring. In some embodiments, the deriving and using the scoring function includes applying a pre-embedding scaler to x, embedding x in $\mathbb{R}^p$: $\tilde{h}(x)=g_\sigma(x, R)\tilde{U}\tilde{S}^{-1/2}$, applying the post-embedding scaler to $\tilde{h}(x)$, projecting centered embedded data using a transformation $$\psi(x) = \tilde{h}(x) Y_k \Lambda^{-\frac{1}{2}},$$

computing the $\ell$ nearest neighbors of $\psi(x)$, $\{y1, \ldots, y\ell\} \subset \Psi(T)$, and returning $$s(x) = \sum_{i=1}^{l} \|\psi(x) - y^i\|.$$

In some embodiments, the returned score s(x) is used to determine whether an MDDP $x \in \mathbb{R}^J$ is normal or is an anomaly. In some embodiments, the performed method further includes: when the MDDP is classified as an anomaly, performing one or more of triggering an alarm, and sending a notification to a user or a data client system, wherein classification of the MDDP as an anomaly is indicative of detection of an unknown undesirable event.

In some embodiments, the deriving includes a training phase using a training dataset, and the computer system is configured to reduce a computational cost by embedding the training dataset such that a number of principal component analysis computations is reduced from $O(n^3)$ computations to $O(n^2p)$ computations, where n is a number of training datapoints and p is an embedding dimension, and wherein p<n.

In some embodiments, the computer system is configured to reduce a computational cost of using the scoring function by embedding datapoints to be scored such that a number of scoring computations is reduced from $O(n^2)$ computations to $O(p^2)$ computations for a single datapoint, where n is a number of datapoints and p is an embedding dimension, and wherein p<n.

Consistent with disclosed embodiments, a method includes: receiving input data including a multidimensional data point (MDDP), deriving a scoring function via data whitening by eigen-decomposition, and using the scoring function to classify the MDDP as normal or as an anomaly. In some embodiments, classification of the MDDP as an anomaly is indicative of detection of an unknown undesirable event, and, when the MDDP is classified as an anomaly, the method further includes performing one or more of triggering an alarm, and/or sending a notification to a user or a data client system.

In some embodiments, the deriving includes, training in a training phase that includes, for a training dataset T, forming an RBF kernel matrix $G_{n \times n}$ for T with σ=J, forming a random matrix $K_{(p+10) \times n}$ whose entries are i.i.d. as a real Gaussian random variable of zero mean and unit variance, applying Rank Revealing QR (RRQR) to a matrix KG to get a set of p reference points R, and applying eigen decomposition to the reference submatrix $\tilde{G}_{p \times p}$ to get $\tilde{U}_{p \times p}$ and $\tilde{S}_{p \times p}$, where $\tilde{G}_{p \times p}$ is a submatrix of $G_{n \times n}$ which is restricted only for the p reference points and where $\tilde{U}_{p \times p}$ and $\tilde{S}_{p \times p}$ are orthogonal and diagonal matrices, respectively.

In some embodiments, the training in the training phase further includes embedding T in $\mathbb{R}^p$: $T_{n \times p} = \tilde{h}(T) = g_\sigma(T, R) \tilde{U} \tilde{S}^{-1/2}$, post-embedding scaling by computing the columns means of T for embedding centralization and centralize it, applying SVD to T, to get $$T = X_{n \times p} \Lambda_{p \times p} Y_{p \times p}^T, \text{ setting } k = \min\left\{ j \mid \sum_{i=1}^{j} \lambda_i > \rho \sum_{i=1}^{p} \lambda_i \right\}$$

to form $\Lambda_k$ and $Y_k$, and projecting centered embedded training data using a transformation $$\psi(x) = \tilde{h}(x) Y_k \Lambda^{-\frac{1}{2}}, x \in T$$

such that outputs of the training phase include: reference set R, a pre-embedding scaler, a post-embedding scaler, $\tilde{U}$, S, $\Lambda_k$, $Y_k$, and $\Psi(T) = \{\psi(x)\}_{x \in T}$.

In some embodiments, inputs to the deriving and using the scoring function include an MDDP $x \in \mathbb{R}^J$, outputs of the training phase, and l—number of nearest neighbors for scoring.

In some embodiments, the deriving and using the scoring function includes applying a pre-embedding scaler to x, embedding x in $\mathbb{R}^p$: $\tilde{h}(x) = g_\sigma(x, R) \tilde{U} \tilde{S}^{-1/2}$, applying the post-embedding scaler to $\tilde{h}(x)$, projecting centered embedded data using a transformation $$\psi(x) = \tilde{h}(x) Y_k \Lambda^{-\frac{1}{2}}$$

computing the l nearest neighbors of ψ(x), {y1, . . . , y l } ⊂ Ψ(T), and returning $$s(x) = \sum_{i=1}^{l} \left\| \psi(x) - y^i \right\|.$$

In some embodiments, the returned score s(x) is used to determine whether an MDDP $x \in \mathbb{R}^J$ is normal or is an anomaly. In some embodiments, the method further includes: when the MDDP is classified as an anomaly, performing one or more of triggering an alarm, and sending a notification to a user or a data client system, wherein classification of the MDDP as an anomaly is indicative of detection of an unknown undesirable event.

In some embodiments, the deriving includes a training phase using a training dataset, and the method includes reducing a computational cost by embedding the training dataset such that a number of principal component analysis computations is reduced from $O(n^3)$ computations to $O(n^2p)$ computations, where n is a number of training datapoints and p is an embedding dimension, and wherein p<n.

In some embodiments, the method includes reducing a computational cost of using the scoring function by embedding datapoints to be scored such that a number of scoring computations is reduced from $O(n^2)$ computations to $O(p^2)$ computations for a single datapoint, where n is a number of datapoints and p is an embedding dimension, and wherein p<n.

In exemplary embodiments, there is/are provided a method or methods for detection of anomalies in HDBD by a derivation of a scoring function which is indicative of undesirable events that are either unknown before the application of the method or methods (referred to as "unknown undesirable events") classified as an unsupervised approach, and systems for implementing such methods.

In an exemplary embodiment, there is disclosed a computer program product, comprising: a non-transitory tangible storage medium readable by a processing circuit and storing instructions for execution by the processing circuit for performing a method comprising: receiving input data including a plurality of multidimensional data points (MDDPs), each MDDP having m≥2 features, to derive a scoring function that provides a probability of whether an MDDP is normal or is an anomaly.

In some embodiments, determining whether an MDDP is normal or is an anomaly includes calculating a score s associated with the MDDP as a probability indication of whether the MDDP is normal or is an anomaly based on the score S, wherein classification of the MDDP as an anomaly is indicative of detection of an unknown undesirable event.

In some embodiments, a method may further include, when the MDDP is classified as an anomaly, triggering an alarm.

In some embodiments, a method may further include, when the MDDP is classified as an anomaly, sending a notification to a user or a data client system.

In some embodiments, the building of the Gaussian kernel from the input data includes building the Gaussian kernel from the training input data.

An anomaly detection method and associated system disclosed herein is characterized by either not having or using domain expertise, signatures, rules, patterns or semantics understanding of all the available features, in other words, it is automatic and unsupervised.

This Summary is provided to introduce a selection of concepts in a simplified form that are further described below in the Detailed Description below. It may be understood that this Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings.

BRIEF DESCRIPTION OF THE DRAWINGS

For simplicity and clarity of illustration, elements shown in drawings are not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
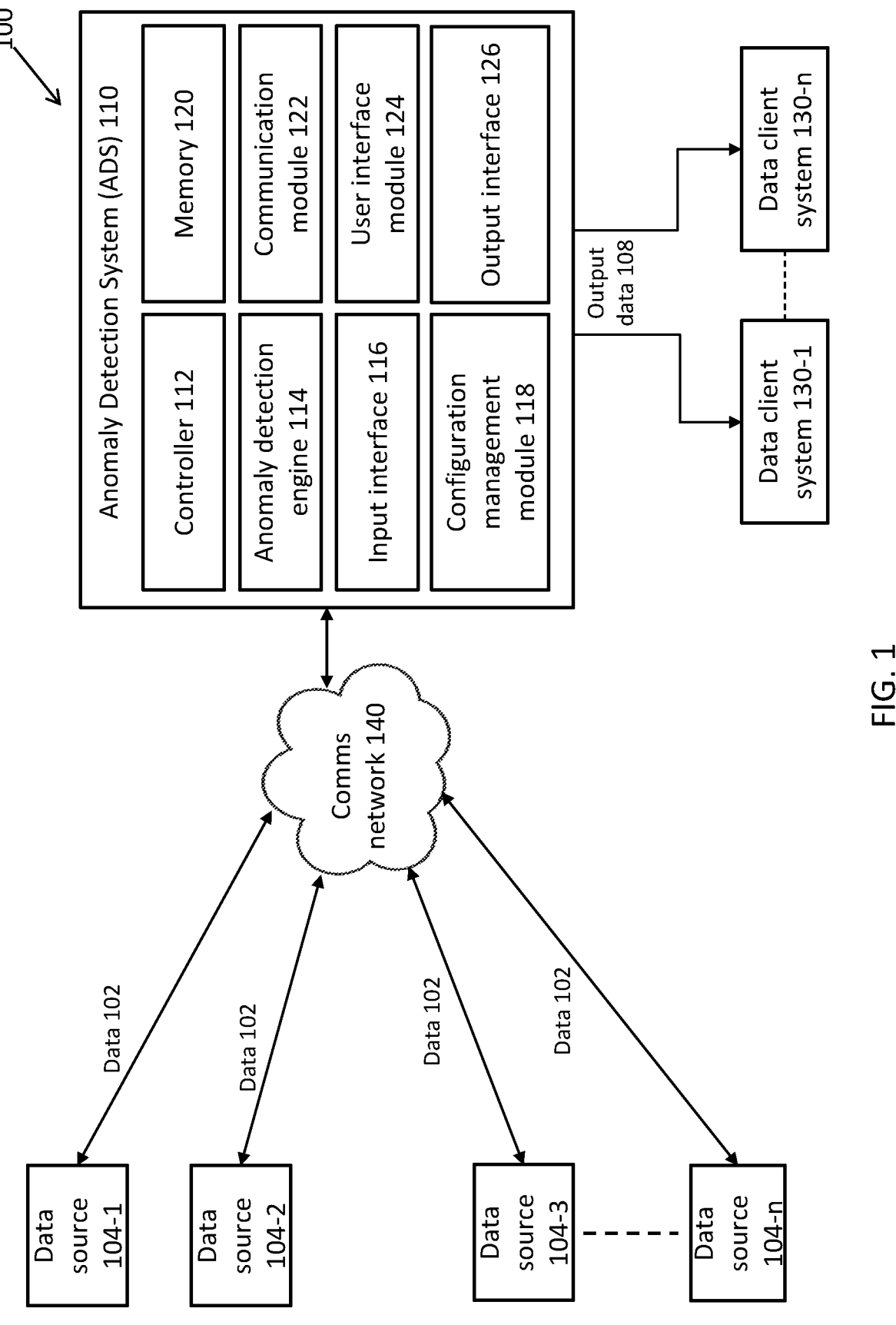
FIG. 1 shows a block diagram of a system for detecting anomalies, according to some implementations.

Reference will now be made in detail to non-limiting examples of anomaly detection systems and methods which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

Aspects of this disclosure may provide a technical solution to the challenging technical problem of anomaly detection and may relate to a system for providing anomaly detection with the system having at least one processor (e.g., processor, processing circuit or other processing structure described herein), including methods, systems, devices, and computer-readable media. For ease of discussion, example methods are described below with the understanding that aspects of the example methods apply equally to systems, devices, and computer-readable media. For example, some aspects of such methods may be implemented by a computing device or software running thereon. The computing device may include at least one processor (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

FIG. 1 shows a system 100 for detection of anomalies in data according to some implementations. As shown in FIG. 1, a system 100 for detection of anomalies in data may include an anomaly detection system (ADS) 110 configured to detect anomalies in data 102 provided to anomaly detection system 110. In some embodiments, data 102 may be provided from data sources 104 to anomaly detection system 100 for detection of anomalies. Data 102 may be of any suitable structure and format and the volume and span (number of parameters) of data 102 may be theoretically unlimited. In some embodiments, varying types and numbers of data sources 104 (shown in FIG. 1 as data source 104-1, 104-2, 104-3 . . . 104-$n$) may provide data 102. Non-limiting examples of data sources 104 may include networks, sensors, data warehouses, risk systems, audit systems, security events managements systems and/or process control equipment. Data 102 provided by data sources 104 may include but is not limited to, for example, historical data, financial data, sensor data, network traffic data, online data, streaming data, databases, production data and/or the like. Data 102 may include training datasets such as the training datasets used in process 200 described below. Training datasets may include known examples of anomalies to be used during a machine learning process such as process 200 when the processing is semi-supervised.

In some embodiments, data sources 104 may be in data communication with anomaly detection system 110 via communications network 140. Communications network 140 may include a wide variety of network configurations and protocols that facilitate the intercommunication of computing devices.

Anomaly detection system 110 may be a computing device as defined herein. Anomaly detection system 110 may be implemented on a server, distributed server, virtual server, cloud based server, and combinations thereof and may make use of cloud and software as a service (SaaS) processing. Anomaly detection system 110 and the modules and components that are included in anomaly detection system 110 may include or may be in communication with a non-transitory computer readable medium (such as memory 120) containing instructions that when executed by at least one processor (such as processor 112) are configured to perform the functions and/or operations necessary to provide the functionality described herein. While anomaly detection system 110 is presented herein with specific components and modules, it should be understood by one skilled in the art, that the architectural configuration of anomaly detection system 110 as shown may be simply one possible configuration and that other configurations with more or fewer components are possible. As referred to herein, the "components" of anomaly detection system 110 may include one or more of the modules or services shown in FIG. 1 as being included within anomaly detection system 110.

Anomaly detection system 110 may include a processor 112. Processor 112 may manage the operation of the components of anomaly detection system 110 and may direct the flow of data between the components of anomaly detection system 110. Where anomaly detection system 110 may be said herein to provide specific functionality or perform actions, it should be understood that the functionality or actions are performed by processor 112 that may call on other components of anomaly detection system 110. Processor 112 may be implemented by various types of processor devices and/or processor architectures including, for example, embedded processors, communication processors, graphics processing unit (GPU), soft-core processors and/or embedded processors. In some embodiments, anomaly detection system 110 may include memory 120 that may include instructions which, when executed by processor 112 may cause the execution of a method or process described herein.

Anomaly detection system 110 may include an anomaly detection engine (ADE) 114. Methods, processes and/or operations for detecting anomalies may be implemented by anomaly detection engine 114. The term "engine" as used herein may also relate to and/or include a computer program module and/or a computerized application and/or one or more hardware, software, and/or hybrid hardware/software modules. Anomaly detection engine 114 may be configured to detect anomalies based on processes 200 and 300 disclosed herein.

In some embodiments, anomaly detection system 110 may include one or more input interfaces 116. Input interface 116 may be configured to ingest and format data 102 and/or 103 for use by anomaly detection engine 114. In some embodiments, anomaly detection system 110 may include a configuration management module 118 which may be configured to configure anomaly detection system 110 such as, for example, to optimize the results of and/or provide judgmental qualitative and quantitative measures on the operation of anomaly detection system 110.

In some embodiments, anomaly detection system 110 may include a communication module 122 for enabling the transmission and/or reception of data, optionally over communication network 140. Communication module 122 may be used for communicating a notification or alarm related to a detected anomaly. Communication module 122 may include human interface components (not shown) such as a display device for displaying information to a user and input devices such as a touch screen and/or a keyboard and a pointing device (e.g., a mouse or a trackball) by which the user can provide input to the computer. Alarms, notifications and warnings related to anomalies may be provided via the above human interface components.

In use, anomaly detection system 110 may filter data 102 and/or 103 to provide output data 108. In some embodiments, output data 108 may be descriptive of analysis results from anomaly detection engine 114. In some embodiments, output data 108 may include filtered input data, i.e., input data (102 or 103) which is free or substantially free of anomalies. In some embodiments, output data 108 may include an alarm or alarms. In some embodiments, output data 108 may include notifications about an anomaly or anomalies. In some embodiments, output data 108 may be provided to one or more data client systems 130 (shown in FIG. 1 as data client systems 130-1, 130-2). Data client systems 130 may include computing devices as defined herein. In some embodiments, output data 108 may be provided to data client systems 130 using a variety of output interfaces 126.

Figure 2:
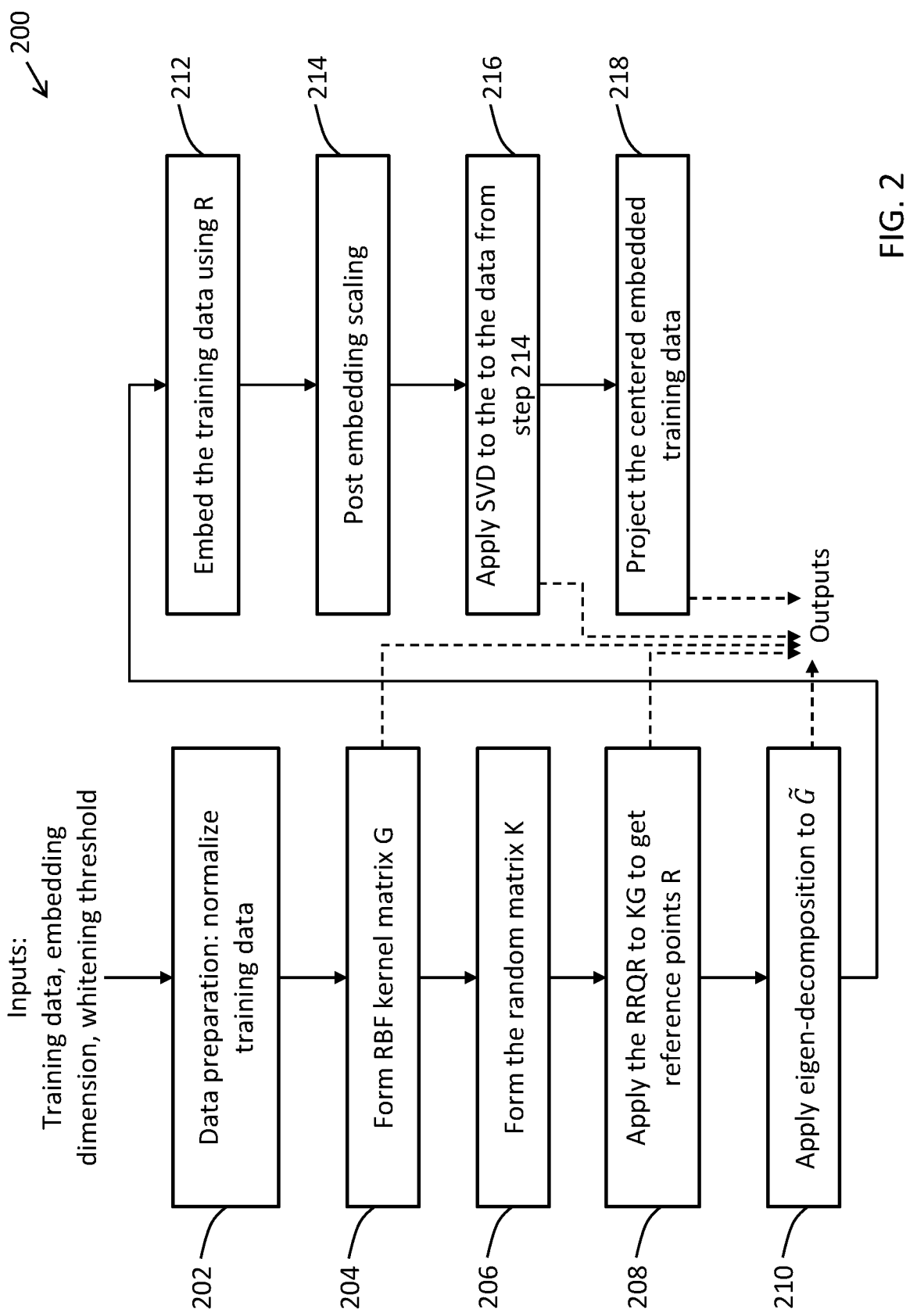
FIG. 2 is a flow diagram of an example process for training input data for derivation of a scoring function for use in anomaly detection according to some implementations.

FIG. 2 is a flow diagram of an example process 200 that describes the training phase of the data for preparing it for the derivation of a scoring function for use in anomaly detection in process 300 (FIG. 3) according to some implementations. Process 200 may be implemented in system 100 as described above. A non-transitory computer readable medium may contain instructions that when executed by at least one processor performs the method and operations described at each of the steps in process 200. The non-transitory computer readable medium and at least one processor may correspond to one or more of anomaly detection engine 114, processor 112 and memory 120 of anomaly detection system 110 as described above and/or other components of anomaly detection system 110 that may be controlled by processor 112. Process 200 may make use of machine learning processes as define herein.

Process 200 may provide the training procedure that is used in process 300 for the derivation of a scoring function by an unsupervised method for anomaly detection. Process 200 may be part of a method including: receiving an input training set including a plurality of multidimensional data points (MDDPs), each MDDP having m≥2 features, embedding dimension and whitening thresholds and deriving a reference set and other parameters that are used as an input to process 300 that derives a function that provides a score giving a probability of whether an MDDP is normal or is an anomaly.

Process 200 is based on the assumption that anomalies (also called outliers) are more likely to be abnormal data points. In process 200, input training data may be mapped from the metric space in which it is immersed into a vector, where principal directions are associated with high density regions in the original metric space. Thus, application of a principal component analysis (PCA) to the embedded space provides the score of the data.

Process 200 operates on a provided training dataset to generate a reference set and embedding parameters. Since PCA of large matrices may be computationally expensive, process 200 may use a set of reference points to accelerate the computations for reducing the computational cost of process 200. The computational reduction is materialized by going from $O(n^3)$ computations to $O(n^2p)$ computations where n is the number of training points and the embedding dimension p<n is a user-defined relatively small number. The computational cost of process 300 (described below), which computes the score for each data point, is reduced from $O(n^2)$ to $O(p^2)$ for a single datapoint. Therefore, processes 200 and 300 as disclosed herein may optimize a computing device's capacity by enabling scoring of more data points per time period to thus improve the functioning of the computing device.

Given a training dataset T of n data points in a metric space (M,m), the goal is to define an abnormality score function s: $M \rightarrow \mathbb{R}$ such that for any x∈ M, the higher s(x) the more likely it is an anomaly. The inputs to process 200 may include the training set $T \subset \mathbb{R}^J$, embedding dimension p, and a whitening threshold $\rho \in (0,1)$. The embedding dimension and whitening threshold are set by the user in system 100.

In step 202, in a pre-embedding scaling step, the training dataset may be normalized by using z-score where the average is subtracted from the data samples of the input and the output is divided by a standard deviation (std) σ of the data samples. In step 204, the normalized dataset T may be embedded in a Euclidean space using the Radial Basis Function (RBF) (Such as described by Buhmann, Martin Dietrich (2003). *Radial basis functions: theory and implementations*. Cambridge University Press) to form an RBF kernel matrix $g_\sigma$: $M \times M \rightarrow \mathbb{R}$ such that $$g_\sigma(x, y) = \exp\{-m(x, y)^2/2\sigma^2\} \tag{1}$$

11 where $g_\sigma(x, y)$ is semi-definite positive that defines an inner product in a high dimensional vector space, i.e., $\langle h(x), h(y) \rangle = g_\sigma(x, y)$, $x$, $y \in T$, for some map h: $M \to \mathbb{R}^n$. The new geometry in $\mathbb{R}^n$ resides on the $n-1$ sphere $S^{n-1}$, and the data points in M, which are relatively close to $\sigma$, are also close on $S^{n-1}$. Thus, for a choice of $\sigma$, principal components of h(T) are associated with the high-density regions in M.

There are several ways to extract a map h from the $n \times n$ matrix $$G_{ij} = g_\sigma(x_i, x_j), x_i, x_j \in T \qquad (2)$$

and all such maps differ by orthogonal transformation. Such a map h is associated with a square root of G, i.e., an $n \times n$ matrix H for which $G = HH^T$. The i-th row of H is then the embedding $h(x_i)$. For example, an eigen decomposition of G, $G = USU^T$, provides $$H = US^{1/2} = GUS^{-1/2}. \qquad (3)$$

In order to reduce the computational cost of h, an approximated version may be formed by using a skeleton of G: a subset of dominant, yet relatively orthogonal columns of G. Such a subset is associated with datapoints in high density areas in (M,m), which are far from each other relative to a. These datapoints are referred to as Reference Points and denoted by $R = \{r_1 \ldots, r_p\}$. Such a skeleton can be achieved by a Rank Revealing QR (RRQR) decomposition of G where $GP = QR$ for a permutation matrix $P_{n \times n}$, an orthogonal matrix $Q_{n \times n}$ and an upper triangular matrix $R_{n \times n}$. RRQR is described in Gu, Ming, Stanley C. Eisenstat (July 1996). "Efficient algorithms for computing a strong rank-revealing QR factorization", SIAM Journal on Scientific Computing. 17 (4): 848-869. Such a decomposition may provide an approximation of G by truncation of the last n-p columns of Q rows of R, denoted $Q_p$ and $R_p$, respectively, with the following spectral error $\|GP - QpRp\| \lesssim (n, s_{p+1})$, where $s_i$ is the i-th largest eigenvalue of G. The first p columns of G, which were chosen by the RRQR procedure (also known as pivots or reference data points), may be extracted from P and, if gathered as the columns of a matrix $B_{n \times p}$, provide $G \approx BC$ for some matrix $C_{p \times n}$. Thus, since G is symmetric, $$G \approx C^T \tilde{G} C \qquad (4)$$

where $\tilde{G}_{p \times p}$ is a submatrix of G which is restricted only for the reference points. This matrix is referred to as a skeleton of G since it encapsulates most of the information stored in G.

In step 206 a random matrix $K_{(p+l) \times n}$ (e.g., l=10) is formed having entries that are Independent and Identically Distributed (i.i.d.), i.e.: each entry of the matrix K is generated independently of the others, and they all follow the same probability distribution, specifically, a Gaussian (normal) distribution of zero mean and unit variance.

In step 208, in order to get the pivots (reference data points), a randomized RRQR may be used by applying RRQR to the matrix KG instead of G such that a set of p reference points R is generated.

In step 210, eigen-decomposition (as described by Golub, Gene H.; Van Loan, Charles F. (1996), Matrix Computations ($4^{th}$ ed.), Baltimore: Johns Hopkins University Press) may be applied to $\tilde{G}_{p \times p}$ to get $\tilde{U}_{p \times p}$ and $\tilde{S}_{p \times p}$ where $\tilde{U}_{p \times p}$ and $\tilde{S}_{p \times p}$ are orthogonal and diagonal matrices, respectively. To compute a p-dimensional approximation for h, let $$\tilde{G} = \tilde{U} \tilde{S} \tilde{U}^T \qquad (5)$$

then the corresponding square root of $\tilde{G}$ is the matrix $$\tilde{H}_{p \times p} = \tilde{U} \tilde{S}^{1/2} = \tilde{G} \tilde{U} \tilde{S}^{-1/2} \qquad (6)$$

and the corresponding embedding in step 212 of the reference set R is $\tilde{h}$: $R \to \mathbb{R}^p$ $$\tilde{h}(r_i) = \tilde{H}[i] \qquad (7)$$

where $\tilde{H}[i]$ is the i-th row of H. Equation (7) provides an embedding of merely the reference points. However, Equation (6) suggests an extension method for any element $x \in M$, by adding a corresponding row to $\tilde{G}$: letting $g_\sigma(x, R) = [g_\sigma(x, r_1), \ldots, g_\sigma(x, r_p)]$ then, based on the distances between x and the reference set R (in (M,m)), extend $\tilde{h}$ R to M, to get $\tilde{h}$: $M \to \mathbb{R}^p$ by $$\tilde{h}(x) = g_\sigma(x, R) \tilde{U} \tilde{S}^{-\frac{1}{2}}, x \in M. \qquad (8)$$

Thus, training set T may be embedded in $\mathbb{R}^p$ using $\mathbb{R}^p$ : $T_{n \times p} = \tilde{h}(T) = g_\sigma(T, R) \tilde{U} \tilde{S}^{-1/2}$. Once the training dataset T is embedded in $\mathbb{R}^p$ , step 214 includes post-embedding scaling that computes the columns means of dataset T for embedding centralization and centralize the embedded data (subtracting the average) and two more steps may be applied: data (semi) whitening and scoring.

In step 216, the principal components of the embedded data are detected, and the data is projected on weighted versions of those components by applying SVD to T, to get $$T = X_{n \times p} \Lambda_{p \times p} Y_{p \times p}^T \text{ and setting } k = \min \left\{ j \mid \sum_{i=1}^{j} \lambda_i > \rho \sum_{i=1}^{p} \lambda_i \right\}$$

to form $\Lambda_k$ and $Y_k$. Specifically, if $T_{n \times p}$ is the matrix that stores $\tilde{h}(T)$ and its SVD is $T = X_{n \times p} X \Lambda_{p \times p} Y_{p \times p}$, then a lower dimension k<p may be set (according to the decay rate of the singular values stored in $\Lambda$), and define $$T_k = X_k \Lambda_k^{1/2} = TY_k \Lambda_k^{-1/2} \qquad (9)$$

where $X_k$ is the $n \times k$ submatrix of X which contains its k leftmost columns, $\Lambda_k$ is the upper left $k \times k$ submatrix of $\Lambda$ and $Y_k$ is the $k \times p$ submatrix of Y which contains its k leftmost columns. Thus, in step 218, the centered embedded training data may be projected with the transformation $\psi$: $M \to \mathbb{R}^k$ results in $$\psi(x) = \tilde{h}(x)Y_k\Lambda_k^{-\frac{1}{2}}. \qquad (10)$$

Usually, p=40 and ρ=0.85 are used.

The outputs of process 200 are: $g_\sigma(x, y)$ (from EQ. 2), reference set R (from EQ. 4), pre-embedding scaler, post-embedding scaler, $\tilde{U}$ and $\tilde{S}$ (from EQ. 5), $\Lambda_k$ and $Y_k$ (from EQ. 8), and ψ(x) (from EQ. 10).

Process 200 may be summarized as follows:

Input: Training set $T \subset \mathbb{R}^J$, embedding dimension p, whitening threshold $\rho \in (0,1)$ Steps:

Step 202: Pre-embedding scaling: Normalize the training set T using z-score where the average is subtracted from the data sample and the output is divided by standard deviation (std).

Step 204: Form the RBF kernel matrix $G_{n \times n}$ for T with σ=J (EQS. 1 & 2)

Step 206: Form a random matrix $K_{(p+10) \times n}$ whose entries are i.i.d., each distributed as a real Gaussian random variable of zero mean and unit variance Step 208: Apply RRQR to KG to get a set of p reference points R Step 210: Apply eigen decomposition to the reference submatrix $\tilde{G}_{p \times p}$ to get $\tilde{U}_{p \times p}$ and $\tilde{S}_{p \times p}$(EQ. 5)

Step 212: Embed T in $\mathbb{R}^p$: $T_{n \times p} = \tilde{h}(T) = g_\sigma(T, R)\tilde{U}\tilde{S}^{-1/2}$ (EQ. 8)

Step 214: Post-embedding scaling: Compute the columns means of T for embedding centralization and centralize it Step 216: Apply SVD to T, to get $$T = X_{n \times p}\Lambda_{p \times p}Y_{p \times p}^T \text{ and set } k = \min\left\{ j \mid \sum_{i=1}^{j}\lambda_i > \rho\sum_{i=1}^{p}\lambda_i \right\} \qquad 35$$

and form $\Lambda_k$ and $Y_k$

Step 218: Project the centered embedded training data:

$$\psi(x) = \tilde{h}(x)Y_k\Lambda_k^{-\frac{1}{2}}, x \in T \qquad (EQ. 9)$$

Figure 3:
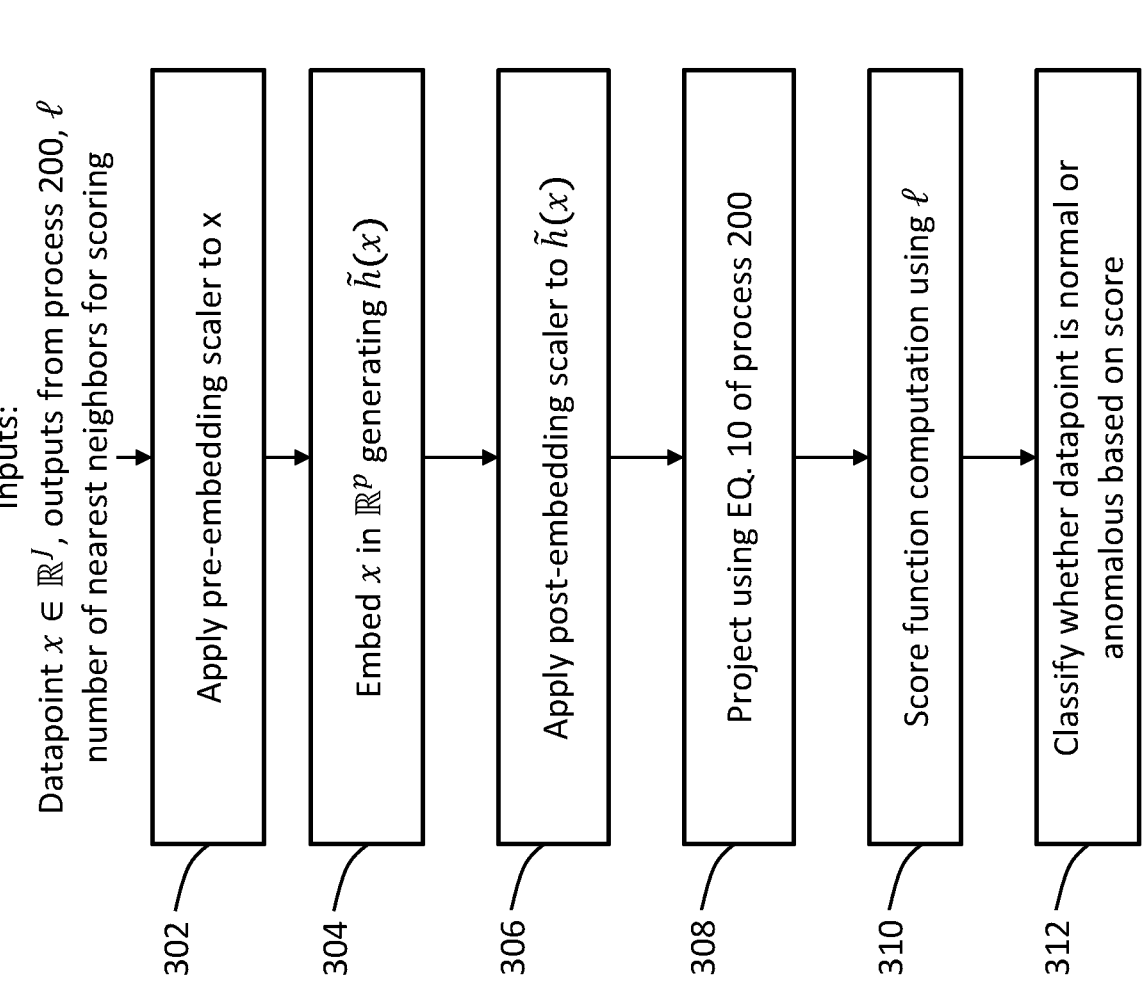
FIG. 3 is a flow diagram of an example process for derivation of a scoring function and use of the scoring function for anomaly detection according to some implementations.

Output: Reference set R, pre-embedding scaler, post-embedding scaler, $\tilde{U}$, S, $\Lambda_k$, $Y_k$,$\Psi(T)=\{\psi(x)\}_{x \in T}$ FIG. 3 is a flow diagram of an example process 300 for deriving and using a scoring function in anomaly detection process according to some implementations. Process 300 may be implemented in system 100 as described above. A non-transitory computer readable medium may contain instructions that when executed by at least one processor performs the method and operations described at each of the steps in process 300. The non-transitory computer readable medium and at least one processor may correspond to one or more of anomaly detection engine 114, processor 112 and memory 120 of anomaly detection system 110 as described above and/or other components of anomaly detection system 110 that may be controlled by processor 112. Process 300 may make use of machine learning processes as defined herein.

Process 300 may provide for determining the score of a datapoint (an MDDP) x using the outputs from process 200 to determine whether the MDDP is normal or anomalous.

The inputs to process 300 may include: datapoint $x \in \mathbb{R}^J$, outputs of process 200, and l—number of nearest neighbors for scoring.

In step 302, a pre-embedding scaler may be applied to x by normalizing x using a z-score. In step 304, x may be embedded in $\mathbb{R}^p$ by $\tilde{h}(x) = g_\sigma(x, R)\tilde{U}\tilde{S}^{-1/2}$ (EQU. 8). In step 306, a post-embedding scaler may be applied to $\tilde{h}(x)$. In step 308 the centered embedded training data may be projected using:

$$\psi(x) = \tilde{h}(x)Y_k\Lambda^{-\frac{1}{2}}, x \in T. \qquad (EQ. 10)$$

In step 310, the scoring of a datapoint x is done by computation of the distances to its l nearest neighbors in the p dimensional space: let y=ψ(x) and let $\{y^1, \ldots, y^l\}$ be its nearest neighbors in ψ(T), then the score function is s: M→ $\mathbb{R}$:

$$s(x) = \sum_{i=1}^{l}\|y - y^i\|. \qquad (11)$$

In step 312, the determined score may be used to classify the MDDP as normal or anomalous and thus whether an anomaly has been detected. In some embodiments and optionally, the detection of an anomaly may trigger an alarm. In some embodiments and optionally, the detection of an anomaly may be followed by a notification (for example sent through output interface(s) 126 as part of output data 108 provided to data client system 130 or via communication module 122. In response to the notification, the user of data client system 130 may, optionally, perform additional actions to prevent an undesirable event associated with the detected anomaly from causing damage to the computer system, to a system from which the raw data was received or is associated with, or to other systems.

Depending on the specific application, finding of an anomaly may indicate an undesirable event such as but not limited to: a cyber-threat, a cyber-attack, malware presence, an operational malfunction, an operational breakdown, a process malfunction, a process breakdown, a medical event, a financial risk event, a financial threat event, financial crimes such as financial fraud event, money laundering, a financial network intrusion event, human trafficking and/or terrorist activities.

Process 300 may be summarized as follows:

Input: datapoint $x \in \mathbb{R}^J$, outputs process 200, l—number of nearest neighbors for scoring.

Steps:

Step 302: Apply the pre-embedding scaler to x

Step 304: Embed x in $\mathbb{R}^p$: $\tilde{h}(x) = g_\sigma(x, R)\tilde{U}\tilde{S}^{-1/2}$ (EQ. 8)

Step 306: Apply the post-embedding scaler to $\tilde{h}(x)$

Step 308: Project:

$$\psi(x) = \tilde{h}(x)Y_k\Lambda_k^{-1/2} \qquad (EQ.10)$$

Step 310: Score: compute the f nearest neighbors of $$\psi(x), \{y1, \ldots, yl\} \subset \Psi(T), \text{ and return } s(x) = \sum_{i=1}^{l}\|\psi(x) - y^i\|$$

Output: score $s(x) \in \mathbb{R}$ that may be used to classify whether the datapoint is an anomaly in Step 312.

Unless otherwise defined, all technical and scientific terms used herein have the same meaning as commonly understood by one of ordinary skill in the art. The materials, methods, and examples provided herein are illustrative only and not intended to be limiting.

As used herein the terms "machine learning" or "artificial intelligence" refer to use of algorithms on a computing device that parse data, learn from the data, and then make a determination or generate data, where the determination or generated data is not deterministically replicable (such as with deterministically oriented software as known in the art).

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may form a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In some embodiments, the anomaly detection system may be implemented on one or more servers or storage systems and/or services associated with a business or corporate entity, including for example, a file hosting service, cloud storage service, a hardware server, a virtual server, an online file storage provider, a peer-to-peer file storage or hosting service and/or a cyber locker. In some embodiments, the anomaly detection system may be provided in various deployments models including but not limited to cloud based, hardware server, or virtual.

Memory (such as memory 120) may include one or more types of computer-readable storage media including, for example, transactional memory and/or long-term storage memory facilities and may function as file storage, document storage, program storage, and/or as a working memory. The latter may, for example, be in the form of a static random-access memory (SRAM), dynamic random-access memory (DRAM), read-only memory (ROM), cache or flash memory. As long-term memory, memory may, for example, include a volatile or non-volatile computer storage medium, a hard disk drive, a solid-state drive, a magnetic storage medium, a flash memory and/or other storage facility. A hardware memory facility may, for example, store a fixed information set (e.g., software code) including, but not limited to, a file, program, application, source code, object code and the like.

In some embodiments, some implementations and/or portions and/or processes and/or elements and/or functions of the anomaly detection engine may be implemented within output interface and/or data client systems. Hence, in some embodiments, output interface and/or data client systems for example may be considered be part of anomaly detection system.

In some embodiments, machine learning algorithms (also referred to as machine learning models or artificial intelligence in the present disclosure) may be trained using training examples, for example in the processes described herein. Some non-limiting examples of such machine learning algorithms may include classification algorithms, data regressions algorithms, image segmentation algorithms, mathematical embedding algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

While certain steps methods are outlined herein as being executed by a specific module and other steps by another module, this should by no means be construed limiting.

It should be understood that where the claims or specification refer to "a" or "an" element, such reference is not to be construed as there being only one of that element. In the description and claims of the present application, each of the verbs, "comprise" "include" and "have", and conjugates thereof, are used to indicate that the object or objects of the verb are not necessarily a complete listing of components, elements or parts of the subject or subjects of the verb.

While this disclosure describes a limited number of embodiments, it will be appreciated that many variations, modifications and other applications of such embodiments may be made. The disclosure is to be understood as not limited by the specific embodiments described herein, but only by the scope of the appended claims.

What is claimed is:

1. A computer program product, comprising: a non-transitory tangible storage medium readable by a processing circuit and storing instructions for execution by the processing circuit for performing a method comprising:

receiving input data including a multidimensional data point (MDDP);

deriving a scoring function by performing data whitening that includes eigen-decomposition of a kernel matrix formed from the input data;

applying a transformation to the input data based on results of the eigen-decomposition to produce whitened data used for deriving the scoring function; and using the scoring function to classify the MDDP as normal or as an anomaly.

2. The computer program product of claim 1, wherein the classification of the MDDP as an anomaly is indicative of detection of an unknown undesirable event, and, when the MDDP is classified as an anomaly, the method further comprises performing one or more of triggering an alarm, and/or sending a notification to a user or a data client system.

3. The computer program product of claim 1, wherein the deriving includes, training in a training phase that includes, for a training dataset T, forming an RBF kernel matrix $G_{n \times n}$ for T with $\sigma = J$, forming a random matrix $K_{(p+10) \times n}$ whose entries are Independent and Identically Distributed (i.i.d.) as a real Gaussian random variable of zero mean and unit variance, applying Rank Revealing QR (RRQR) to a matrix KG to get a set of p reference points R, and applying eigen decomposition to a reference submatrix $\tilde{G}_{p \times p}$ to get $\tilde{U}_{p \times p}$ and $\tilde{S}_{p \times p}$, where $\tilde{G}_{p \times p}$ is a submatrix of $G_{n \times n}$ which is restricted only for the p reference points and where $\tilde{U}_{p \times p}$ and $\tilde{S}_{p \times p}$ are orthogonal and diagonal matrices, respectively.

4. The computer program product of claim 3, wherein the training in the training phase further includes embedding T in $\mathbb{R}^p$: $T_{n \times p} = \tilde{h}(T) = g_\sigma(T, R)\tilde{U}\tilde{S}^{-1/2}$, post-embedding scaling by computing the columns means of T for embedding centralization and centralize it, applying SVD to T, to get $$T = X_{n \times p} \Lambda_{p \times p} Y_{p \times p}^T, \text{ setting } k = \min\left\{ j \mid \sum_{i=1}^{j} \lambda_i > \rho \sum_{i=1}^{p} \lambda_i \right\}$$

to form $\Lambda_k$ and $Y_k$ where $\Lambda_k$ is the upper left k×k submatrix of $\Lambda$ and $Y_k$ is the k×p submatrix of Y which contains its k leftmost columns, and projecting centered embedded training data using a transformation

18

$$\psi(x) = \tilde{h}(x)Y_k \Lambda_k^{-\frac{1}{2}}, x \in T$$

such that outputs of the training phase include reference set R, a pre-embedding scaler, a post-embedding scaler, $\tilde{U}$, S, $\Lambda_k$, $Y_k$, and $\Psi(T) = \{\psi(x)\}_{x \in T}$.

5. The computer program product of claim 4, wherein inputs to the deriving and using the scoring function include an MDDP $x \in \mathbb{R}^J$, outputs of the training phase, and l—number of nearest neighbors for scoring.

6. The computer program product of claim 5, wherein the deriving and using the scoring function includes applying a pre-embedding scaler to x, embedding x in $\mathbb{R}^p$: $\tilde{h}(x) = g_\sigma(x, R)\tilde{U}\tilde{S}^{-1/2}$, applying the post-embedding scaler to $\tilde{h}(x)$, projecting $$\psi(x) = \tilde{h}(x)Y_k \Lambda_k^{-\frac{1}{2}},$$

computing the $\ell$ nearest neighbors of $\psi(x)$, $\{y^1, \ldots, y^\ell\} \subset \Psi(T)$, and returning $$s(x) = \sum_{i=1}^{l} \left\| \psi(x) - y^j \right\|.$$

7. The computer program product of claim 1, wherein the deriving includes a training phase using a training dataset, wherein the computer program product is configured to reduce a computational cost by embedding the training dataset such that a number of principal component analysis computations is reduced from $O(n^3)$ computations to $O(n^2p)$ computations, where n is a number of training datapoints and p is an embedding dimension, and wherein p<n.

8. The computer program product of claim 1, wherein the computer program product is configured to reduce a computational cost of using the scoring function by embedding datapoints to be scored such that a number of scoring computations is reduced from $O(n^2)$ computations to $O(p^2)$ computations for a single datapoint, where n is a number of datapoints and p is an embedding dimension, and wherein p<n.

9. A computer system, comprising a hardware processor configurable to perform a method comprising:

receiving input data including a multidimensional data point (MDDP);

deriving a scoring function by performing data whitening that includes eigen-decomposition of a kernel matrix formed from the input data;

applying a transformation to the input data based on results of the eigen-decomposition to produced whitened data used for deriving the scoring function; and using the scoring function to classify the MDDP as normal or as an anomaly.

10. The computer system of claim 9, wherein the classification of the MDDP as an anomaly is indicative of detection of an unknown undesirable event, and, when the MDDP is classified as an anomaly, the hardware processor is further configurable to perform one or more of triggering an alarm, and/or sending a notification to a user or a data client system.

11. The computer system of claim 9, wherein the deriving includes, training in a training phase that includes, for a training dataset T, forming an RBF kernel matrix $G_{n \times n}$ for T with $\sigma = J$, forming a random matrix $K_{(p+10) \times n}$ whose entries are Independent and Identically Distributed (i.i.d.) as a real Gaussian random variable of zero mean and unit variance, applying Rank Revealing QR (RRQR) to a matrix KG to get a set of p reference points R, and applying eigen decomposition to a reference submatrix $\tilde{G}_{p \times p}$, to get $\tilde{U}_{p \times p}$ and $\tilde{S}_{p \times p}$, where $\tilde{G}$p×p is a submatrix of $G_{n \times n}$ which is restricted only for the p reference points and where $U_{p \times p}$ and $\tilde{S}_{p \times p}$ are orthogonal and diagonal matrices, respectively.

12. The computer system of claim 11, wherein the training in the training phase further includes embedding T in $\mathbb{R}^p$ : $T_{n \times p} = \tilde{h}(T) = g_\sigma(T, R) \tilde{U} \tilde{S}^{-1/2}$, post-embedding scaling by computing the columns means of T for embedding centralization and centralize it, applying SVD to T, to get $$T = X_{n \times p} \Lambda_{p \times p} Y_{p \times p}^T, \text{ setting } k = \min\left\{ j \mid \sum_{i=1}^{j} \lambda_i > \rho \sum_{i=1}^{p} \lambda_i \right\}$$

to form $\Lambda_k$ and $Y_k$ where $\Lambda_k$ is the upper left k×k submatrix of $\Lambda$ and $Y_k$ is the k×p submatrix of Y which contains its k leftmost columns, and projecting centered embedded training data using a transformation $$\psi(x) = \tilde{h}(x) Y_k \Lambda_k^{-\frac{1}{2}}, x \in T$$

such that outputs of the training phase include reference set R, a pre-embedding scaler, a post-embedding scaler, $\tilde{U}$, S, $\Lambda_k$, $Y_k$, and $\Psi(T) = \{\psi(x)\}_{x \in T}$.

13. The computer system of claim 12, wherein inputs to the deriving and using the scoring function include an MDDP $x \in \mathbb{R}^J$ , outputs of the training phase, and l—number of nearest neighbors for scoring.

14. The computer system of claim 13, wherein the deriving and using the scoring function includes applying a pre-embedding scaler to x, embedding x in $\mathbb{R}^p$ : $h(x) = g_\sigma(x, R) \tilde{U} \tilde{S}^{-1/2}$, applying the post-embedding scaler to $\tilde{h}(x)$, projecting $$\psi(x) = \tilde{h}(x) Y_k \Lambda_k^{-\frac{1}{2}},$$

computing the $\ell$ nearest neighbors of $\psi(x)$, $\{y^1, \ldots, y^\ell\} \subset \Psi(T)$, and returning $$s(x) = \sum_{i=1}^{l} \left\| \psi(x) - y^i \right\|.$$

15. The computer system of claim 9, wherein the deriving includes a training phase using a training dataset, wherein the computer system is configured to reduce a computational cost by embedding the training dataset such that a number of principal component analysis computations is reduced from $O(n^3)$ computations to $O(n^2 p)$ computations, where n is a number of training datapoints and p is an embedding dimension, wherein p<n.

16. The computer system of claim 9, configured to reduce a computational cost of using the scoring function by embedding datapoints to be scored such that a number of scoring computations is reduced from $O(n^2)$ computations to $O(p^2)$ computations for a single datapoint, where n is a number of datapoints and p is an embedding dimension, wherein p<n.

17. A method comprising:
receiving input data including a multidimensional data point (MDDP);
deriving a scoring function by performing data whitening that includes eigen-decomposition of a kernel matrix formed from the input data;
applying a transformation to the input data based on results of the eigen-decomposition to produced whitened data used for deriving the scoring function; and
using the scoring function to classify the MDDP as normal or as an anomaly.

18. The method of claim 17, wherein the classification of the MDDP as an anomaly is indicative of detection of an unknown undesirable event, and, when the MDDP is classified as an anomaly, the method further comprises performing one or more of triggering an alarm, and/or sending a notification to a user or a data client system.

19. The method of claim 17, wherein the deriving includes, training in a training phase that includes, for a training dataset T, forming an RBF kernel matrix $G_{n \times n}$ for T with σ=J, forming a random matrix $K_{(p+10) \times n}$ whose entries are Independent and Identically Distributed (i.i.d.) as a real Gaussian random variable of zero mean and unit variance, applying Rank Revealing QR (RRQR) to a matrix KG to get a set of p reference points R, and applying eigen decomposition to a reference submatrix $\tilde{G}_{p \times p}$ to get $\tilde{U}_{p \times p}$ and $\tilde{S}_{p \times p}$, where $\tilde{G}_{p \times p}$ is a submatrix of $G_{n \times n}$ which is restricted only for the p reference points and where $\tilde{U}_{p \times p}$ and $\tilde{S}_{p \times p}$ are orthogonal and diagonal matrices, respectively.

20. The method of claim 19, wherein the training in the training phase further includes embedding T in $\mathbb{R}^p$ : $T_{n \times p} = \tilde{h}(T) = g_\sigma(T, R) \tilde{U} \tilde{S}^{-1/2}$, post-embedding scaling by computing the columns means of T for embedding centralization and centralize it, applying SVD to T, to get $$T = X_{n \times p} \Lambda_{p \times p} Y_{p \times p}^T, \text{ setting } k = \min\left\{ j \mid \sum_{i=1}^{j} \lambda_i > \rho \sum_{i=1}^{p} \lambda_i \right\}$$

to form $\Lambda_k$ and $Y_k$ where $\Lambda_k$ is the upper left k×k submatrix of $\Lambda$ and $Y_k$ is the k×p submatrix of Y which contains its k leftmost columns, and projecting centered embedded training data using a transformation $$\psi(x) = \tilde{h}(x) Y_k \Lambda_k^{-\frac{1}{2}}, x \in T$$

such that outputs of the training phase include reference set R, a pre-embedding scaler, a post-embedding scaler, $\tilde{U}$, S, $\Lambda_k$, $Y_k$, and $\Psi(T) = \{\psi(x)\}_{x \in T}$.

21. The method of claim 20, wherein inputs to the deriving and using the scoring function include an MDDP $x \in \mathbb{R}^J$ , outputs of the training phase, and l—number of nearest neighbors for scoring.

22. The method of claim 21, wherein the deriving and using the scoring function includes applying a pre-embedding scaler to x, embedding x in $\mathbb{R}^p$ : $h(x) = g_\sigma(x, R) \tilde{U} \tilde{S}^{-1/2}$, applying the post-embedding scaler to $\tilde{h}(x)$, projecting $$\psi(x) = \tilde{h}(x) Y_k \Lambda_k^{-\frac{1}{2}},$$

computing the $\ell$ nearest neighbors of $$\psi(x), \left\{y^1, \ldots, y^\ell\right\} \subset \Psi(T), \text{ and returning } s(x) = \sum_{i=1}^{\ell} \left\|\psi(x) - y^i\right\|.$$

23. The method of claim 17, wherein the deriving includes a training phase using a training dataset, wherein the method provides a reduced computational cost by embedding the training dataset such that a number of principal component analysis computations is reduced from $O(n^3)$ computations to $O(n^2p)$ computations, where n is a number of training datapoints and p is an embedding dimension, and wherein p<n.

24. The method of claim 17, wherein the method provides a reduced computational cost of using the scoring function by embedding datapoints to be scored such that a number of scoring computations is reduced from $O(n^2)$ computations to $O(p^2)$ computations for a single datapoint, where n is a number of datapoints and p is an embedding dimension, and wherein p<n.

\* \* \* \* \*